Nov. 12, 1963

A. D. STRUBLE, JR 3,110,457

VARIABLE VOLUME BALLOON

Filed Aug. 6, 1962

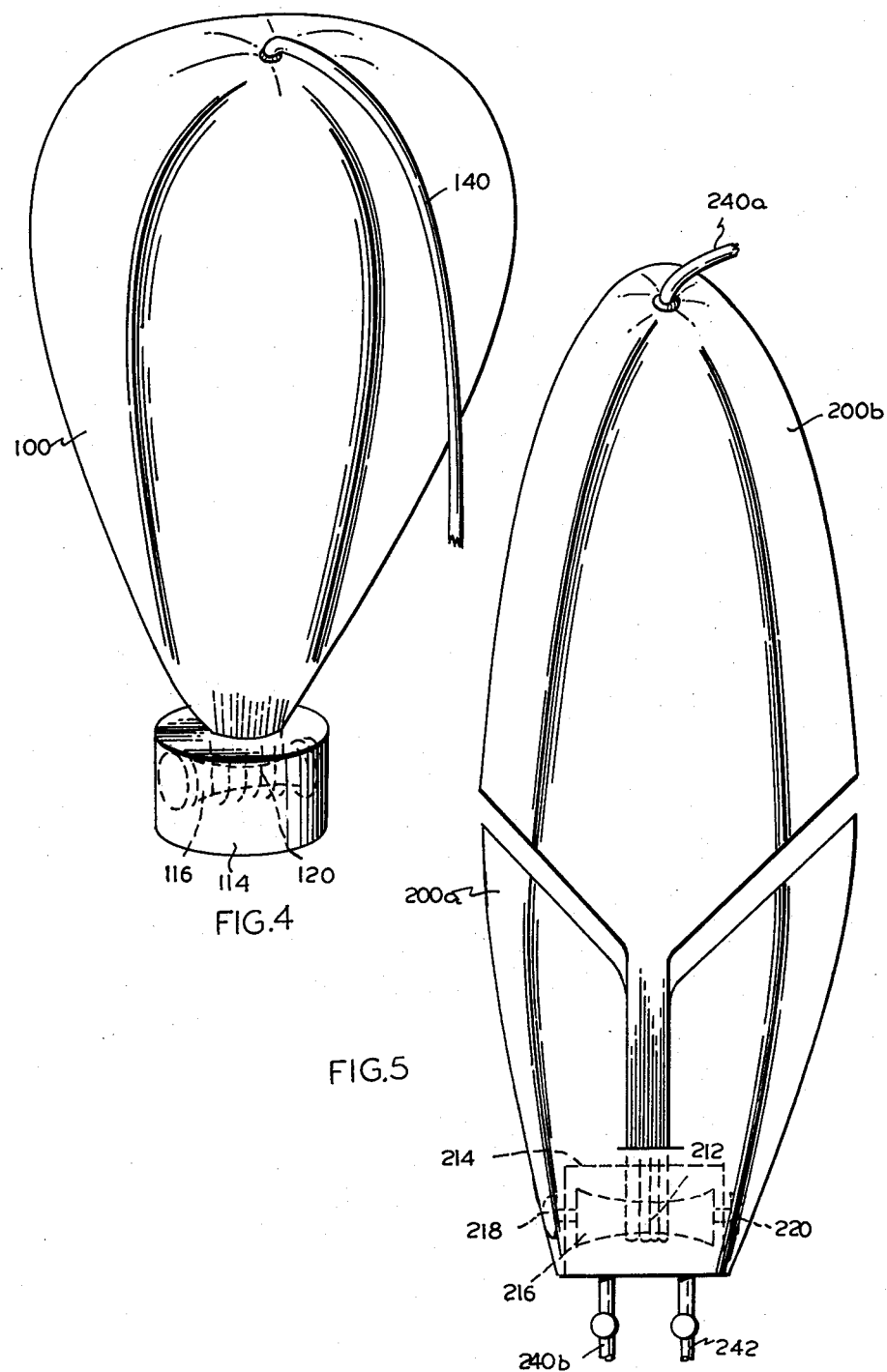

United States Patent Office 3,110,457
Patented Nov. 12, 1963

3,110,457
VARIABLE VOLUME BALLOON
Arthur D. Struble, Jr., Palos Verdes Estates, Calif.
(1754 Crenshaw Blvd., Torrance, Calif.)
Filed Aug. 6, 1962 Ser. No. 215,036
18 Claims. (Cl. 244—31)

This invention generally relates to a novel balloon structure. More particularly this invention relates to a novel type of balloon structure which permits the size and shape of a balloon to be changed in a controlled manner as the balloon ascends into the stratosphere.

Balloons which are capable of carrying substantial loads and which are capable of ascending into the stratosphere must necessarily be rather large. The balloon envelope before inflation is very bulky and difficult to manipulate and handle. In nearly every stratosphere balloon, the balloon envelope is only partially inflated at ground level because capacity must be provided for the lifting gas to expand greatly as the balloon ascends to the very low pressure of the stratosphere. The present procedure for launching such balloons is to inflate them at ground level with a relatively small bubble of gas which is inserted at the lower end of the balloon and then the gas is passed through the folds of the balloon material toward the upper end of the balloon. The balloon at the beginning of inflation is usually lying on the ground and the gas must pass from the lower end through a considerable length of balloon to get to the upper end of the balloon.

The launching of balloons in this manner is a difficult, risky operation, particularly when the launch area is windy. Current weather balloons have a climb speed in the neighborhood of 650–900 feet per minute. This speed is not fast enough to avoid strain and damage to the balloon when the ascending balloon encounters severe cross winds and other atmospheric turbulence. The "excess" portion of the balloon which is not inflated at launch frequently is whipped by the wind and a sail-like effect often results in the balloon being blown far off course before it has risen very far. In order to protect the balloon against these detrimental effects, many balloons have been made from fabric which is of greater thickness than is really necessary if these dangerous conditions did not exist. As a result their upper altitude is limited to 100,000–120,000 feet.

It is therefore a primary object of this invention to provide a balloon which largely overcomes many of the aforementioned problems. In particular, it is an object of this invention to produce a balloon which will rise at faster rates and to higher altitudes than present balloons. Another object of this invention is to provide a balloon which is capable of making controlled changes in shape as it ascends. A further object of the invention is to provide a balloon structure which will avoid the exposure of great uninflated segments of the balloon envelope to turbulent atmospheric conditions during the ascension.

These and other objects and advantages will become more apparent after reading the following specific description in conjunction with the drawings, wherein:

FIGURE 4 is a perspective view of another embodiment of the invention;

FIGURE 5 is a perspective view of still another embodiment of the invention.

The present invention broadly involves a high altitude balloon comprising:

(a) a balloon envelope,
(b) a gas inlet for said balloon envelope,
(c) part of said balloon envelope being inflated at the time of launch and part of said balloon envelope being uninflated at the time of launch,
(d) the uninflated part of said balloon envelope being wound around a reel means,
(e) said reel means being arranged to unwind in such a manner that as the balloon ascends more of the balloon envelope will become available for inflation purposes.

Figure 1:
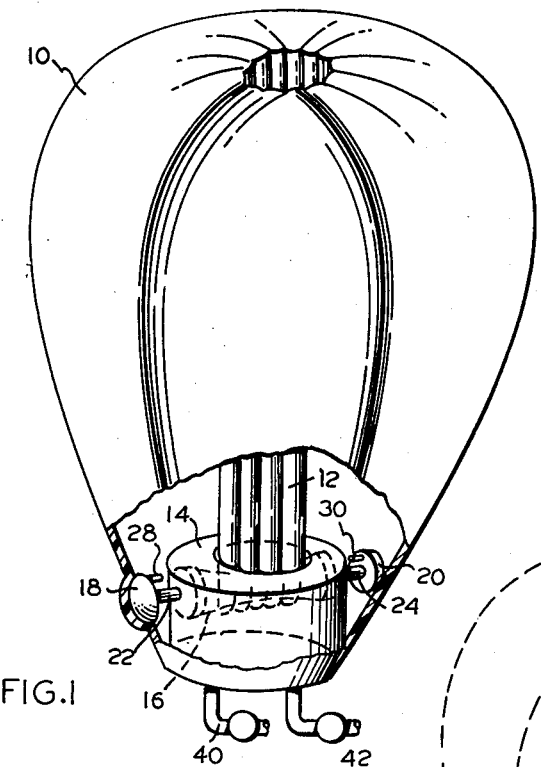
FIGURE 1 is a perspective view (partially cut away) of a novel balloon in accordance with this invention.

Referring now to FIGURE 1, there is shown in a perspective view one embodiment of a novel balloon in accordance with the teachings of this invention. It will be seen that this balloon comprises an outer film-type envelope 10 (made of rubber, plastic or the like) which is filled with any suitable inflating gas. One way of introducing the inflating gas into the balloon envelope is by a valve means such as 40 which is shown as being located in the lower reel carriage section 14 of the balloon structure. It will be noted that the lower outer portion (or bottom section) of the balloon envelope 10 is attached to the outer lower periphery of the carriage section 14 in a gas-tight manner. It will be further observed that the central portion of the balloon envelope is folded inwardly upon itself as is indicated by the numeral 12 and at launch at least part of this folded portion 12 is wound around a reel 16. Reel 16 is mounted on a shaft 15 which extends across opposite sides of the carriage 14 and shaft 15 controls the rotation of the reel 16 as will be described hereinafter. Thus, when inflation gas is introduced through inlet 40 it will pass outwardly through the open upper part of the carriage housing 14 into the interior of the balloon envelope.

Figure 2:
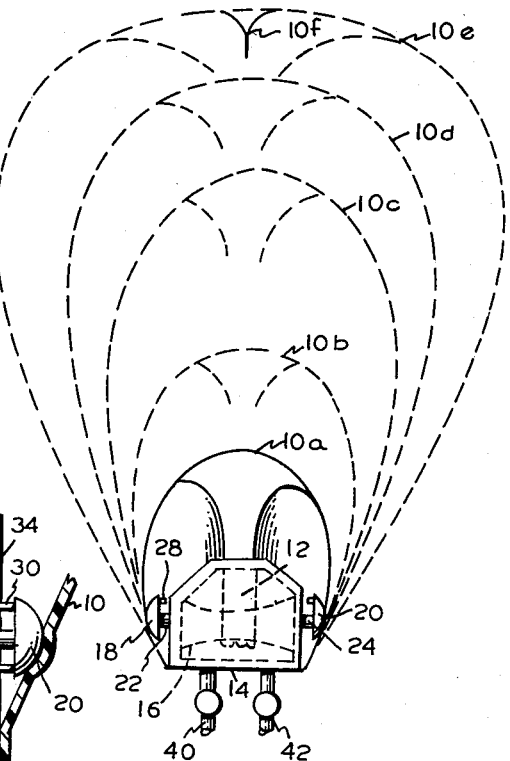
FIGURE 2 is a view illustrating the sequential changes in shape of a balloon in accordance with this invention as it ascends.

FIGURE 2 is primarily designed to illustrate that as the amount and/or pressure of the inflating gas within the balloon envelope 10 is increased the balloon envelope will progressively enlarge (primarily in a vertical direction) as is indicated by the dotted lines 10a, 10b, 10c, and 10e in FIGURE 2. When the balloon has reached its outermost expanded position (as indicated by 10e) it will be understood that there will be very little (or no) remaining folded portion and the top center of the balloon envelope will then only be attached to the reel by means of a rope or cable 10f, although in some instances it may be desirable to omit such a rope or cable. The balloon in accordance with this invention is preferably designed and operated so that sufficient gas is introduced into the balloon envelope at launch to start the balloon along its upward path. Once the balloon has started to rise the lower pressures encountered will automatically cause a change in the shape of the balloon envelope as is very generally indicated by the dotted lines in FIGURE 2.

In accordance with one embodiment of this invention the reel 16 is spring or tension loaded so that as the balloon rises from its launch position and as the reduced pressure around the outside of the balloon causes the gas within the balloon to expand in an outward direction, the outward movement of the inflating gas will cause the inflated portion of the balloon to exert an upward pull upon the folded portion 12, which, as noted previously, is at least partially wound around the reel 16. The tension loading on reel 16 can be set so that it will permit unwinding of the folded portion until the upward pull upon the folded portion has been reduced a desired amount.

In accordance with another embodiment of this invention (and with particular reference to a manned balloon) the reel can be manipulated and the folded portion unwound from the reel in accordance with the wishes of a man located in or adjacent to the carriage section 14.

In accordance with still another embodiment of this invention the unwinding of the reel can be accomplished by remote control means located on the ground, or by a mechanical unit which is set prior to launch to accomplish unreeling in a predetermined fashion. Numerous other manual, automatic and semi-automatic means for controlling the unwinding action of the reel will occur to those skilled in this art.

Since, as noted earlier, the configuration of the balloon primarily changes in a vertical direction, one way of controlling the action of the reel is to coordinate its action with the configuration of the lower portion of the balloon. For example, with many balloon structures it is possible to arrange it so that the balloon will rise to the desired altitude while the configuration of the lower portion of the balloon is maintained substantially constant, or only converges or diverges to a rather limited degree. When this condition prevails then the variation of the configuration of the lower portion of the balloon from a fixed position (or from a fixed range of positions) can be used to actuate a mechanism which will in turn control the action of the reel. Such an arrangement is indicated most clearly in FIGURES 1, 2 and 3 and particularly in FIGURE 3. Let us assume for example that the configuration of the lower portion of the balloon walls 10 (shown in FIGURE 3) represents the angularity with respect to the vertical which is known beforehand to be most desirable for the balloon during its entire ascent. As the balloon structure rises from its launch pad and ascends into the sky, the balloon envelope will gradually expand and the lower portions of the balloon envelope 10 will diverge farther away from each other. As these lower portions of the balloon envelope continue to diverge, a point will be reached where they will no longer exert any inward force upon brake extensions 18 and 20. When this occurs brake extensions 18 and 20 as well as one or more teeth 28 and 30 thereon will become disengaged from the notches 32 and 34 respectively which are located in the outer surface of carriage 14 by virtue of the outward force exerted by spring 26 against brake shafts 22 and 24. Brake shafts 22 and 24 and the inner portion of reel 16 into which they fit are preferably polygonal in cross section so that there will be no relative rotation between the two. For this reason then when teeth 28 and 30 are not engaged in notches 32 and 34, reel 16 is free to rotate about shaft ends 15 and 17— and the folded portion 12 may then unwind to at least a limited extent. As the folded portion 12 unwinds, more balloon envelope becomes available for inflation, particularly in an upward direction, and as a result of this increased gas volume availability the outward pressure of the gas upon the lower wall portions of the envelope is reduced and these wall portions will then reverse their previous action and begin to converge toward one another. As they do so they will eventually press inwardly against the brake extensions 18 and 20 so that the teeth 28 and 30 will once again engage notches 32 and 34. Such engagement will of course result in a stopping of the rotation of reel 16 and the folded portion 12 will cease to unfold. This sequence of actions may be repeated any desired number of times depending upon the strength, shape and location of the aforementioned elements. Other similar or equivalent arrangements will readily occur to those skilled in the art.

Figure 3:
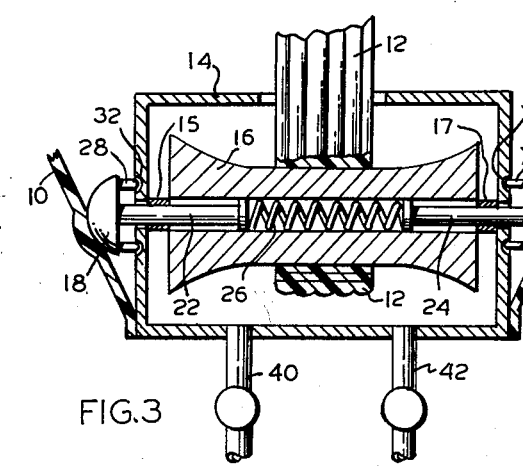
FIGURE 3 is a fragmentary enlarged view of the lower part of the balloon structure shown in FIGURE 1.

In FIGURES 1–3, numeral 42 represents a gas outlet means to regulate the pressure within the balloon should such regulation be desirable or necessary in connection with the launching, guidance or descent of the balloon. Gas outlet means could obviously be controlled manually, automatically or semi-automatically and numerous suitable arrangements will occur to those in the art.

FIGURE 4 illustrates an additional embodiment of the invention wherein the balloon envelope 100 is filled from the top through an inlet 140. As shown, only the upper portion of the ballon envelope 100 is inflated prior to and at launch. Once enough inflating gas has been introduced into the balloon envelope to cause it to ascend the supply of gas can be discontinued and in fact the inlet 140 can be disconnected or closed off. The mooring lines (not shown) for the balloon may then be released and the entire balloon structure will rise into the air. As the balloon ascends the gas within the balloon will exert an increasing outward pressure. In order to accommodate this increasing outward pressure it is intended that the lower portion 120 of the balloon, which is shown as being wound around reel 116, will unwind upwardly. More particularly, the lower wound portion 120 of the balloon is carried within a carriage section 114 which also houses the reel 116. A person riding in the carriage seciton 114 can unwind the balloon manually by rotating the reel 116 or automatic or semi-automatic means could be used to unwind the reel as those skilled in the art will appreciate. The importance of the structure shown in FIGURE 4 is that only that portion of the balloon which is effectively necessary for inflation is exposed to the atmospheric turbulence at any given moment. Thus, one can avoid the troubles which frequently occur when large exposed uninflated sections of the balloon are present, as has been noted earlier.

It would of course involve no invention to modify the carriage section 114 so that the reel 116 would function in a manner similar to FIGURE 1.

FIGURE 5 illustrates still another embodiment wherein the balloon envelope is filled both at the top and at the bottom. The upper portion 200b of the balloon is filled at the top through inlet 240a and through the bottom portion 200a by means of inlet 240b. As shown, the middle portion of the balloon has been tucked inwardly and then folded around a reel 216, such reel operating in much the same manner as has been described in connection with FIGURES 1–4. Accordingly, as the balloon ascends the folded portion 212 of the balloon that is located at approximately the central axis of the balloon and which is wound around reel 216 will unwind upwardly either by virtue of the control exercised by the person located in the carriage 214 or due to automatic or semi-automatic means associated with the reel. When the entire balloon is fully inflated no folded portion will remain on the reel and the outer configuration of the balloon will be continuous rather than indented inwardly in the somewhat "bisected" manner shown.

Another important aspect of this invention is that it permits various portions of the balloon envelope to be made of different materials in accordance with the strength requirements of that particular section of the balloon. To illustrate, let us refer to FIGURE 2 and assume that the dotted curvature 10b represents the configuration of the exposed portion of the balloon envelope after it has reached an altitude of forty thousand feet. It will be noted that this exposed portion of the balloon envelope is minor compared to the unexposed portion of the envelope which is still wound around the reel. Now, since it is known that most of the strains, tensions and other adverse forces (i.e. ground handling forces, launching strains, high wind shears, etc.) occur in the lower levels of the atmosphere (below 40,000 feet) it can be seen that it would be quite worthwhile to make all of the balloon envelope which would be exposed at 40,000 feet of relatively heavy and strong balloon envelope material. The remainder of the balloon (i.e. the unexposed portion still wound around the reel) can be made of much lighter and weaker material since after the balloon ascends above 40,000 feet it will not encounter the same stresses and tensions that are present at lower altitudes. In fact, instead of making the balloon envelope of only two different strength materials it is quite possible that 5 or 10 different strength materials could be used, the various materials becoming "exposed" in the order of their decreasing strength properties as the balloon ascends. This can result in considerable economic savings and in addition reduces the over-all weight of the balloon so that higher altitudes can be attained. These considerations apply regardless of whether the balloon is of the type shown in FIGURES 1, 4 or 5. Also, the aforementioned height of 40,000 feet is only exemplary, and one might choose any desired altitude at which the "exposed" balloon envelope would change its strength characteristics. The transition from one strength material could obviously be made in a number of ways. For example a high strength section could simply comprise multiple layers and the weaker strength sections a lesser number of layers or a single layer. Alternatively, sheets of different thickness could be sewn, adhered or bonded together at their edges. Also vertical panels of the balloon could be extruded so that the thickness of the panel would progressively vary along the vertical height of the panel.

The balloon structures in accordance with this invention have many obvious advantages. Control over the shape and size of the balloon during its ascent avoids overpressuring. The filling arrangement (particularly the bottom filling) permits easy access, simple construction and simple filling equipment. Higher wind launching conditions can be tolerated with this arrangement. Valving of the balloon is easily controllable and quite reliable. Control of the balloon tension prior to launch can be closely controlled with the reel and thus can give a higher wind accommodation and lower susceptibility to ground damage. Each of the designs has a very short ground height so that there is no long moment arm or loose fabric involved during inflation to complicate the launch problem and limit wind accommodation. Furthermore, no special or expensive ground equipment is required for launching. Compactness of the deflated unit wound on a reel is especially suitable for transporting and immediately available for inflation without the necessity of any preliminary layout or special provisions. Also, all system control is associated with the apex point at the bottom and can be easily effected by man or motor. The configuration of the valving control and the reeling arrangement is such that it can be used to create a superpressure condition giving increased control, faster response and a more efficient ballast technique. With the reel arrangements of this invention the balloon envelope can be rewound during descent so that even in the event of a rough landing the major portion of the balloon can be recovered intact. This is normally not the case with conventional balloons. Once they have been used, they are normally damaged beyond repair during the landing and ground recovery. By using the reel, the balloon envelope may be increased or decreased in volume at the will of the operator. The internal gas pressure is affected in the process. Volume change is, of course, a direct control of balloon lift; thus the operator has direct control of lift without losing lifting gas or ballast. Thus, superpressure lift control is achieved. Control of superpressure (and lift as a consequence) can be extremely useful in controlling the balloon flight wherein it can take the place of ballast control to descend or climb and/or compensate for superheat and diernal temperature changes. Obviously, if superpressure can take the place of releasing ballast, or releasing lifting gas, it is a much more efficient control system.

In conclusion, while there have been illustrated and described several preferred embodiments of my invention, it is to be understood that since the various details of construction may obviously be varied considerably (e.g. the shape and size of the balloon envelopes) without really departing from the basic principles and teachings of this invention, I do not limit myself to the precise constructions herein disclosed and the right is specifically reserved to encompass all changes and modifications coming within the scope of the invention as defined in the appended claims. Having thus described my invention, what I claim as new and desire to secure a United States Letters Patents for is:

What is claimed is:
1. A high altitude balloon structure comprising:
   (a) a balloon enevlope,
   (b) a gas inlet for said balloon envelope,
   (c) part of said balloon envelope being inflated at the time of launch and part of said balloon envelope being uninflated at the time of launch,
   (d) the uninflated part of said balloon envelope being wound around a reel means,
   (e) said reel means being attached to a portion of the balloon envelope and arranged to unwind in such a manner that as the balloon ascends more of the balloon envelope will become available for inflation and expansion purposes, said reel means rising to high altitudes with said balloon.
2. A balloon structure according to claim 1 wherein said gas inlet is in the bottom half of the balloon.
3. A balloon structure in accordance with claim 2 wherein said reel means is located in a carriage adjacent the bottom half of the balloon.
4. A balloon structure according to claim 3 wherein said reel is positioned on a shaft within said carriage.
5. A balloon structure in accordance with claim 4 wherein said reel is operatively connected with brake means for restraining the rotational movement of the reel.
6. A balloon structure in accordance with claim 5 wherein said brake means is adapted to be activated and deactivated in accordance with the degree of divergence and convergence of the lower side walls of the balloon.
7. A balloon structure in accordance with claim 1 wherein said gas inlet is in the top of the balloon.
8. A balloon structure in accordance with claim 7 wherein said reel means is located in a carriage adjacent the bottom half of the balloon.
9. A balloon structure according to claim 8 wherein said reel is positioned on a shaft within said carriage.
10. A balloon structure in accordance with claim 9 wherein said reel is operatively connected with brake means for restraining the rotational movement of the reel.
11. A balloon structure in accordance with claim 10 wherein said brake means is adapted to be activated and deactivated in accordance with the degree of divergence and convergence of the lower side walls of the balloon.
12. A balloon structure in accordance with claim 1 wherein there are gas inlets at both the bottom and top of the balloon.
13. A balloon structure in accordance with claim 12 wherein said reel means is located in a carriage adjacent the bottom half of the balloon.
14. A balloon structure according to claim 13 wherein said reel is positioned on a shaft within said carriage.

15. A balloon structure in accordance with claim 14 wherein said reel is operatively connected with brake means for restraining the rotational movement of the reel.

16. A balloon structure in accordance with claim 15 wherein said brake means is adapted to be activated and deactivated in accordance with the degree of divergence and convergence of the lower side walls of the balloon.

17. A balloon structure in accordance with claim 1 wherein the portion of the balloon envelope which is exposed to the atmosphere during the early stages of the ascent has greater strength characteristics than the portion of balloon envelope which only becomes exposed during the later stages of the ascent.

18. A high altitude balloon according to claim 1 wherein said reel means can be used to create a superpressure condition giving increased control, faster response and more efficient ballast technique.

References Cited in the file of this patent
UNITED STATES PATENTS

| | | |
|---|---|---|
| 33,165 | Sherman | Aug. 27, 1861 |
| 2,758,804 | Hakomaki | Aug. 14, 1956 |
| 2,919,869 | Hopper et al. | Jan. 5, 1960 |
| 2,997,259 | Huch et al. | Aug. 22, 1961 |